Patented July 18, 1933

1,918,555

UNITED STATES PATENT OFFICE

EDWIN M. PARTRIDGE, OF HAMMOND, INDIANA, ASSIGNOR TO NATIONAL ALUMINATE CORPORATION, OF CHICAGO, ILLINOIS, A CORPORATION OF DELAWARE

BOILER COMPOUND

No Drawing.   Application filed March 16, 1932.   Serial No. 599,327.

Boiler feed water is commonly treated to prevent the formation of scale on the heating surfaces of the boiler. Scale forms ordinarily as a result of the deposition of salts of calcium and magnesium on these heating surfaces. Treatment may be by external means such as lime and soda or zeolite softeners which remove the calcium and magnesium before the water enters the boiler or by internal means. Internal treatment is given by adding chemicals to the feed water which cause no more than a slight immediate precipitation and separation of the calcium or magnesium from the water. The chemicals are carried into the boiler with the water and have their effect on the calcium and magnesium therein.

One class of chemicals commonly used for internal treatment may be designated as precipitant chemicals since their effect is to precipitate the calcium and magnesium as a non-adherent sludge in the boiler instead of allowing their natural deposit as an adherent scale. The precipitant chemicals commonly employed in internal feed water treatment are soda ash, caustic soda and sodium phosphate, either singly or in combination. A difficulty which is encountered in the use of these precipitant chemicals is the stopping of boiler feed lines through the deposition therein of the slight initial precipitate which occurs with their use.

To prevent such stoppage of feed lines, it is common practice among those skilled in the art to add some organic matter, generally tannin extract, along with the precipitant chemicals used. The organic matter delays the action of the precipitant chemicals until the water enters the boiler or until the water has passed points where danger of stoppage exists. For convenience in handling, the precipitant chemical or chemicals used are frequently made into briquettes together with the desired organic matter and a suitable binder. These briquettes are commonly added to the water by placing them in a closed vessel through which part or all of the boiler feed water passes and carries them into the boiler.

Another chemical of value in the internal treatment of boiler feed water is sodium aluminate. While itself a precipitant chemical it has the additional values of preventing carry-over of boiler water by coagulating the suspended matter in the boiler water and of acting alone or with magnesium to unite with silica in solution in the feed water and prevent its forming into hard boiler scale. The practice has been followed on a large scale of including tannin extract, sodium aluminate and precipitant chemicals in the same briquettes intended for boiler feed water treatment. Such practice is not efficient as the tannin extract and sodium aluminate thus brought into intimate contact in the briquette react chemically to produce an insoluble formation. This reaction renders the entire briquette less soluble than desirable. It hinders the proper solution and functioning of both the tannin extract and sodium aluminate. The tannin extract cannot properly inhibit the initial precipitation of line stopping deposits since it cannot go completely and readily into solution. The sodium aluminate not going completely into solution permits its settling out in the feed lines or in any vessel such as a heater or storage tank through which the feed water passes through after treatment and before entering the boiler.

I have found a new and novel method of using the desired tannin extract, sodium aluminate and precipitant chemicals in convenient briquette form without trouble developing through the reaction which occurs when sodium aluminate and tannin extract are brought into intimate contact. My method is to form the tannin extract into briquettes using one portion of the precipitant chemical and the sodium aluminate into briquettes using another portion of the precipitant chemical. Briquettes containing precipitant chemical and tannin extract and briquettes containing precipitant chemical and sodium aluminate can then be used to treat the water either simultaneously or with first one type of briquette and then the other. The tannin extract containing and sodium aluminate containing briquettes can even be placed in a common vessel and suitable results obtained as the briquettes must dissolve and the tannin extract and sodium aluminate dissolve in the feed water before they can come into a position to react chemically with each other. In the dilute solution which results from the feed water flowing in contact with the briquettes as described there is no immediate formation and precipitation of the insoluble product which results when tannin extract and sodium aluminate are mixed in the same briquette. The tannin extract is thus in a condition which will permit it to exert its functions as an agent to inhibit quick initial and objectionable deposition of scale forming matter before the water enters the boiler and the sodium aluminate passes into solution and can flow with the feed water into the boiler.

As an example of a suitable tannin extract briquette with precipitant chemicals I give the following composition:

|  | Parts |
|---|---|
| Soda ash | 67 |
| 50% caustic solution | 10 |
| Powdered chestnut extract | 20 |
| Water | 3 | the chemicals mentioned being mixed and pressed into briquettes. As an example of a suitable sodium aluminate containing briquette I give the following composition:

|  | Parts |
|---|---|
| Soda ash | 55 |
| Sodium aluminate | 20 |
| Dextrine | 8 |
| 50% caustic solution | 5 |
| Water | 12 | these chemicals being mixed separately from those listed above and pressed into briquettes.

In carrying out my invention I do not limit myself to the exact composition given as above for suitable briquettes but claim as my invention:

1. The treatment of boiler feed water with tannin extract, sodium aluminate and precipitant chemicals in briquetted form, the sodium aluminate and part of the precipitant chemical being included in one set of briquettes and the tannin extract and the remainder of the precipitant chemical being included in a separate set of briquettes.

2. The process of treating water which comprises contacting the same with briquettes containing a precipitant and tannin extract and with briquettes containing a precipitant and sodium aluminate.

3. The process of treating water which comprises contacting the same with briquettes containing soda ash, caustic soda and chestnut extract and with briquettes containing soda ash, sodium aluminate, caustic soda and dextrine.

E. M. PARTRIDGE.